(12) United States Patent
Tsirkin

(10) Patent No.: US 10,929,164 B2
(45) Date of Patent: Feb. 23, 2021

(54) ENHANCING ABILITY OF A HYPERVISOR TO DETECT AN INSTRUCTION THAT CAUSES EXECUTION TO TRANSITION FROM A VIRTUAL MACHINE TO THE HYPERVISOR

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 343 days.

(21) Appl. No.: 15/901,438

(22) Filed: Feb. 21, 2018

(65) Prior Publication Data
US 2019/0258501 A1 Aug. 22, 2019

(51) Int. Cl.
*G06F 9/455* (2018.01)
*G06F 11/30* (2006.01)

(52) U.S. Cl.
CPC ...... *G06F 9/45558* (2013.01); *G06F 11/3037* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,239,789 B2 | 1/2016 | Offen et al. | |
| 9,292,417 B2 | 3/2016 | Salsamendi | |
| 9,367,345 B1 * | 6/2016 | Tsirkin | G06F 3/0604 |
| 9,459,984 B2 | 10/2016 | Bratanov | |
| 9,489,228 B2 | 11/2016 | Tsirkin et al. | |
| 9,529,615 B2 | 12/2016 | Yehuda et al. | |
| 9,606,825 B2 | 3/2017 | Tsirkin et al. | |
| 9,830,286 B2 | 11/2017 | Tsirkin et al. | |
| 2006/0010440 A1 * | 1/2006 | Anderson | G06F 9/45533 718/1 |

OTHER PUBLICATIONS

Gary Wang, Zachary J., et al, "Hypervisor Introspection: A Technique for Evading Passive Virtual Machine Monitoring", University of Illinois at Urbana-Champaign, 2014, 8 pages.

Lowe, Scott D., "Best Practices for Oversubscription of CPU, Memory and Storage in vSphere Virtual Environments", Dell Inc., Aug. 16, 2013, 13 pages.

* cited by examiner

*Primary Examiner* — Bing Zhao
(74) *Attorney, Agent, or Firm* — Lowenstein Sandler LLP

(57) ABSTRACT

Systems and methods for enabling a hypervisor to more efficiently determine the instruction executed by the virtual machine that causes a transition event. An example method may comprise: determining, by a processing device executing a hypervisor, a data storage location of a particular instruction of a guest operating system; detecting, by the hypervisor, a transition event between a virtual machine executing the guest operating system and the hypervisor, wherein the virtual machine comprises a virtual processor; comparing, by the hypervisor, an instruction pointer of the virtual processor and the data storage location of the particular instruction to determine a cause of the transition event; and executing, by the hypervisor, an operation corresponding to the cause of the transition event.

19 Claims, 6 Drawing Sheets

ENHANCING ABILITY OF A HYPERVISOR TO DETECT AN INSTRUCTION THAT CAUSES EXECUTION TO TRANSITION FROM A VIRTUAL MACHINE TO THE HYPERVISOR

TECHNICAL FIELD

The present disclosure is generally related to virtualization in a computing environment, and more particularly, to virtualization technology that enhances a hypervisor's ability to efficiently detect the instruction that causes execution to transition from a virtual machine to the hypervisor.

BACKGROUND

Virtualization allows multiplexing of an underlying host machine between different virtual machines. The virtualization is commonly provided by a hypervisor (e.g., virtual machine monitor (VMM)) and enables the hypervisor to allocate a certain amount of a host system's computing resources to each of the virtual machines. Each virtual machine is then able to configure and use virtualized computing resources (e.g., virtual processors) to execute executable code of a guest operating systems.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
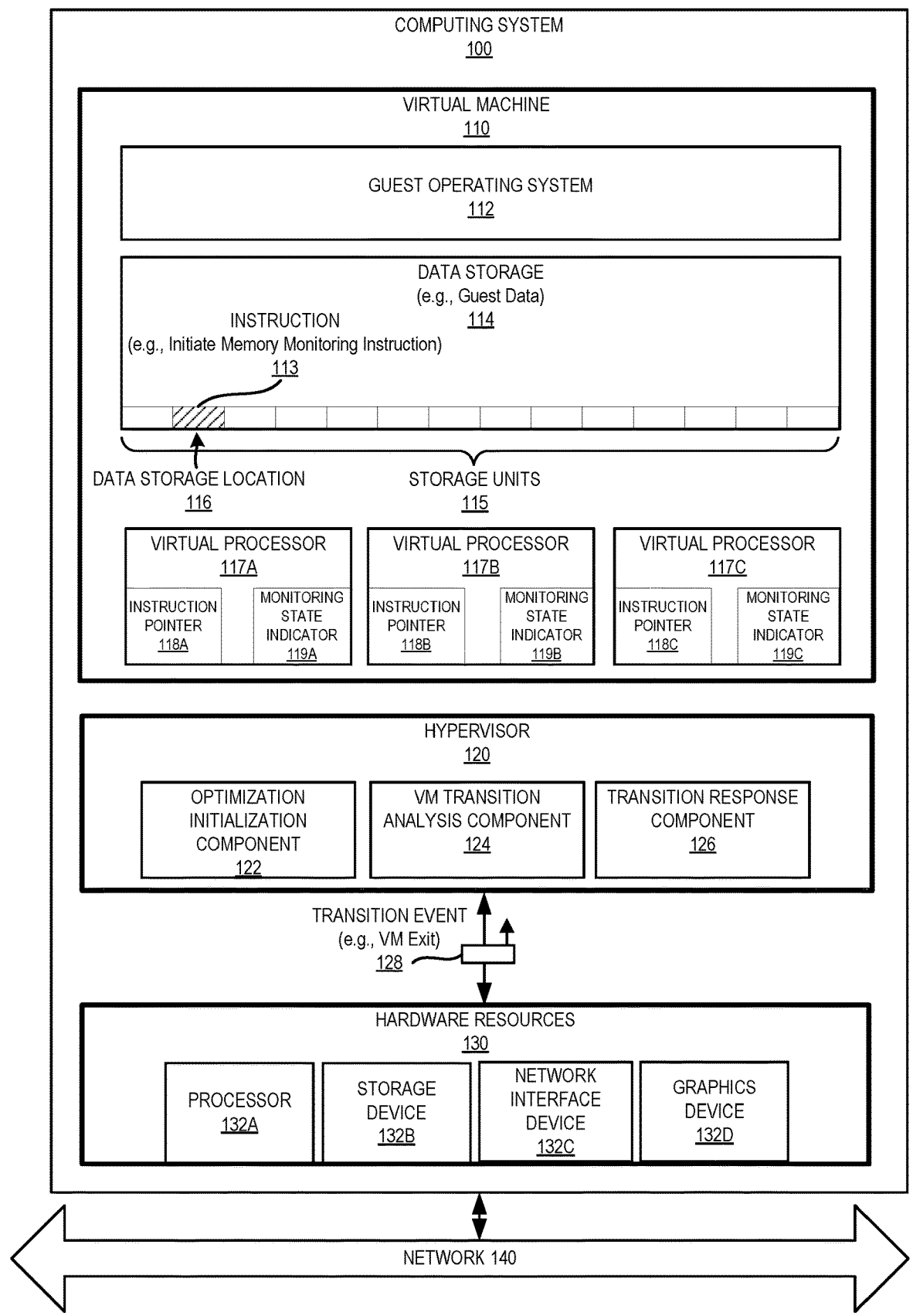
FIG. 1 depicts a high-level block diagram of an example computing system that enables a hypervisor to determine the guest instruction that caused a transition event, in accordance with one or more aspects of the present disclosure.

Modern computer systems often include virtualization technology that transitions execution of a physical processor between a hypervisor and one or more virtual machines. Each transition may correspond to a transition event that may be initiated by a virtual machine (VM), a hypervisor, a hardware device, other entity, or a combination thereof. The transition event may include information that indicates the entity initiating the transition and one or more reasons for the transition. In one example, the transition event may mark the point at which a transition is made between the virtual machine currently running and the hypervisor, which may exercise control for a particular reason. The transition event may provide a reason code but the reason code may be a general numeric code and may not indicate to the hypervisor the particular instruction executed by the virtual machine that caused the transition event. When transition events are initiated by the virtual machine, the instruction executed by the virtual machine may provide valuable insight as to the cause of the transition event.

Enabling a hypervisor to determine the particular instruction causing the transition event is traditionally a resource intensive operation. For example, a hypervisor may analyze the transition event and work backwards to determine the virtual machine instruction that caused the transition event. This may involve one or more additional transitions and may involve transitioning back to the virtual machine to analyze the previously executed instruction. Each transition may involve resource intensive operations that introduce overhead to the virtualization and may adversely affect the performance and/or efficiency of the computing system.

Aspects of the present disclosure address the above and other deficiencies by providing technology that enables a hypervisor to determine a particular instruction executed by the virtual machine that caused the transition event. An example method may involve a hypervisor determining one or more data storage locations for a particular instruction of a guest operating system. The particular instruction may be known to cause transition events. The data storage locations of the particular instruction may be received from the guest operating system before, during, or after an initialization of the guest operating system. After the guest operating system is initialized, the hypervisor may detect a transition event between a virtual machine executing the guest operating system and the hypervisor. The virtual machine may include a virtual processor that includes an instruction pointer. The hypervisor may compare the instruction pointer of the virtual processor with the instruction data storage location previously received from the guest operating system. In one example, the instruction pointer and the data storage location may both be memory addresses of an address space that is separate from or unknown to the hypervisor (e.g., guest virtual address space). The hypervisor may compare the values of the instruction pointer and the data storage location to determine if the values match. A match may indicate that the particular instruction that is known to cause transitions was responsible for the recently detected transition event. This may enable the hypervisor to determine the cause of the transition event (e.g., originating guest instruction) and execute one or more optimization operations that correspond to the cause of the transition event.

The systems and methods described herein include technical improvements to virtualization technology. In particular, aspects of the present disclosure may enhance the ability of the hypervisor to detect the instruction that caused the virtual machine to initiate a transition event. This may enable the hypervisor to more accurately detect the state or configuration of the virtual machine and to take actions to enhance the operation of the virtualized environment. In another aspect, the present disclosure may enable the detection to be performed by the hypervisor in a more resource efficient manner. Detecting the cause of a transition may be performed by the hypervisor using a comparison of data storage locations. In one example, this may involve a numerical comparison between two data storage values (e.g., memory addresses). The location comparison may enable the hypervisor to avoid analyzing the content at the data storage locations, which may involve additional overhead to transition back to the virtual machine or to resolve a data storage location to a location of a physical device. Enhancing the ability and efficiency of the hypervisor may improve the virtualization technology. The enhancement may enable a computing system to reduce the amount of computing resources consumed by a set of virtual machines or enable the computing system to support an increased number of virtual machines using the same amount of computing resources.

Various aspects of the above referenced methods and systems are described in details herein below by way of examples, rather than by way of limitation. The examples provided below discuss the method above applied to a virtualized computer system that includes an instruction that initiates memory monitoring features of a virtual or physical processor. In other examples, the method and system discussed herein may be applied to any particular instruction that is known to cause a transition from a virtual machine to a hypervisor.

The memory monitoring features may enable a virtual or physical processor to perform inter-processor communication and reduce the quantity of inter-processor interrupts. A common approach to queuing a task for execution by a processor of a multi-processor system may involve a first processor sending an inter-processor interrupt (IPI) to a second processor (e.g., target processor). A more resource-efficient way of queueing a task may involve the use of memory monitoring features that enable a target processor to enter an idle state and avoid use of an inter-processor interrupt to exit the idle state and perform work. A processor that supports the x86 instruction set architecture (ISA) may include a monitor configuration instruction (e.g., MONITOR) and a monitor initiation instruction (e.g., MWAIT). Other instruction set architectures may have the same or similar instructions. The monitor configuration instruction may configure subsequent monitoring by providing a predetermined storage region (e.g., memory address range) to a platform-specific storage monitoring hardware. The corresponding monitor initiation instruction (e.g., MWAIT) may cause the processor to enter a specified implementation-dependent optimized state (e.g., idle state) while waiting for a store operation to the specified address range. The processor may eventually exit the implementation-dependent optimized state responsive to detecting, by the monitoring hardware, a modification operation (e.g., memory write) to the predetermined storage region. The implementation-dependent optimized state may, for example, be represented by one of the low power consumption "sleeping" states.

In one example, an idle processor of a multi-processor system may set a processor flag (e.g., polling bit) to indicate to other processors the memory monitoring state of the processor and may subsequently transition to the memory monitoring state, e.g., by executing the memory monitoring initiation instruction. Another processor may execute an atomic operation to check the processor flag of the idle processor and modify a waiting task flag to indicate that a task has been queued for the idle processor. The waiting task flag may reside within the predetermined storage region being monitored and the modification may cause the idle processor to exit the memory monitoring state. Upon exiting the memory monitoring state, the idle processor may check the waiting task flag and proceed to execute the task if the waiting task flag is set or may return to the memory monitoring state if the waiting task flag is not set.

In a virtualized environment, the processor may be a virtual processor (e.g. vCPU) that is associated with a physical processor. The memory monitoring features discussed above may be supported by the virtual processors but may not be optimized for use in a virtualized environment. For example, each virtual processor may be implemented by a respective processing thread that may be scheduled to run on a physical processor. In a hypothetical scenario, an idle virtual processor may set its memory monitoring state (e.g., polling flag) and may subsequently transition into a memory monitoring state by executing the monitoring initialization instruction (e.g., MWAIT). Upon expiration of the time slice allocated to the idle virtual processor, the processing thread implementing the idle virtual processor may be preempted and another virtual processor may be scheduled to run on that physical processor. While the idle virtual processor is not scheduled to run on the physical processor, it is not monitoring the predetermined storage region, but the polling flag remains set irrespective of the virtual processor scheduling status on the physical processor. This may lead to another virtual processor attempting to queue a task for the idle virtual processor while the idle virtual processor is not running on the physical processor. Since the memory monitoring hardware is not performing memory monitoring at that time, the idle virtual processor may not exit the memory monitoring state. Thus, an attempt to schedule a task for the idle virtual processor may not invoke a response from the virtual processor as expected. To address this, the hypervisor may periodically execute each of the virtual processors so that the virtual processor can poll the predetermined storage region. There may be hundreds or thousands of virtual processors and a majority of the polling may be a waste of physical processor cycles.

The systems and methods of the present disclosure may be advantageous for a virtualized environment that supports a virtual processor's use of memory monitoring features. In accordance with one or more aspects of the present disclosure, a virtual machine executing a guest operating system may notify the hypervisor of a data storage location of a particular instruction. The particular instruction may be a guest instruction used to initiate the memory monitoring features (e.g., MWAIT). The hypervisor may then detect a subsequent transition event initiated by the virtual machine, which may be the same or similar to a VM Exit. The VM Exit may refer to a transition of a physical processor from a guest execution mode to a virtual machine extension (VMX) mode. The guest execution mode may be a privileged guest execution mode (e.g., guest kernel mode) or an unprivileged guest execution mode (e.g., guest user mode). Upon receiving the execution control, the hypervisor managing the virtual machine may clear the monitoring state indicator (e.g., polling flag) of the virtual processor. Clearing the monitoring state indicator of the virtual processor may cause other virtual processors to avoid relying on the memory monitoring features to perform inter-processor communications and may cause the other virtual processors to use inter-processor interrupts. The hypervisor may then listen for the inter-processor interrupts and avoid executing the virtual processor to perform the memory monitoring (e.g., polling activity).

The hypervisor may cause the virtual processor to stop the memory monitoring and may alter the sleep state of virtual processor. Altering the sleep state may cause the virtual processor to switch to an optimized execution state (e.g., lower power consumption state) to reduce the physical processing resources consumed by the virtual processor. In one example, the optimized execution state may involve completely stopping, halting, or unplugging the virtual processor. Amongst physical processors, the memory monitoring features may reduce computational overhead, but in a virtualized environment with multiple virtual processors, the reduction may not offset the overhead introduced by periodically transitioning to the virtual machine to enable the virtual processor to monitor the memory. Therefore, the systems and methods described herein represent improvements to the functionality of general purpose or specialized computing devices operating a virtualized environment with one or more virtual processors.

FIG. 1 depicts an illustrative architecture of elements of a computing system 100, in accordance with an embodiment of the present disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a virtual machine 110, a hypervisor 120, hardware resources 130, and a network 140.

Virtual machine 110 may execute guest executable code that uses an underlying emulation of physical resources. Virtual machine 110 may support hardware emulation, full virtualization, para-virtualization, operating system-level virtualization, or a combination thereof. The guest executable code may include a guest operating system 112, a guest application, guest device drivers, etc. Virtual machine 110 may execute one or more different types of guest operating system 112, such as Microsoft®, Windows®, Linux®, Solaris®, etc. Guest operating system 112 may manage the computing resources of virtual machine 110 and manage the execution of one or more computing processes.

A computing process may comprise one or more streams of execution for executing instructions. The stream of execution may include a sequence of instructions that can be executed by one or more processing devices (e.g., physical or virtual processors). The computing process may be managed by a kernel of guest operating system 112, hypervisor 120, a host operating system (not shown), or a combination thereof. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters, and a state (e.g., running, ready, waiting, start, done). In one example, a computing process may be an instance of a computer program that is being executed by a virtual processor and may execute an instruction 113.

Instruction 113 may be a particular instruction associated with guest operating system 112. Instruction 113 may include any form of executable code that is capable of being executed by a virtual processor or physical processor of computing system 100. Instruction 113 may include one or more instructions, operations, commands, machine code, operation codes (e.g., opcodes), binary code, other executable code, or a combination thereof. Instruction 113 may comply with an interface of the computing system 100. The interface may be a shared boundary between different devices, components, module, other feature, or a combination thereof. Instruction 113 may be a hardware instruction for a hardware interface provided by virtual processor 117. The hardware interface may comply with a standardized or proprietary instruction set architecture (ISA) of the virtual or physical processor. In one example, instruction 113 may be an instruction for initiating a memory monitoring feature of virtual processor 117 as discussed in more detail below. Instruction 113 may be stored within data storage 114 at one or more data storage locations 116.

Data storage 114 may be data storage that is allocated by hypervisor 120 for use by virtual machine 110. Guest operating system 112 may organize and configure data storage 114 into one or more storage units 115. Storage units 115 may be logical or physical units of data storage for storing, organizing, or accessing data. A storage unit may include a contiguous or non-contiguous sequence of bytes or bits. In one example, a storage unit may be a virtual representation of underlying physical storage units, which may be referred to as physical storage blocks. Storage units 115 may have a unit size that is the same or different from a physical block size provided by an underlying hardware resource. The block size may be a fixed-size, such as a particular integer value (e.g., 4 KB, 4 MB, 1 GB) or may be a variable-size that varies within any range of integer values.

Storage units 115 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, storage units 115 may be a memory segment and each memory segment may correspond to an individual memory page, multiple memory pages, or a portion of a memory page. In other examples, each of the storage units 115 may correspond to a portion (e.g., block, sector) of a mass storage device (e.g., hard disk storage, solid state storage). In either example, a particular portion of data storage 114 may be identified using a data storage location 116.

Data storage location 116 may include identification data that indicates a particular location in data storage 114 that stores instruction 113. The identification data of the data storage location 116 may include numeric or non-numeric data that enables computing system 100 to locate the instruction within data storage of the virtual machine. Data storage location 116 may indicate one or more locations in data storage 114 and each of the locations may include instruction 113. Data storage location 116 may include a memory location in the form of a memory address. The memory address may be a virtual address, a logical address, a physical address, other address, or a combination thereof. The memory address may correspond to any address space of virtual machine 110, guest operating system 112, hypervisor 120, host operating system (not shown), or a combination thereof. In one example, data storage location 116 may be a guest virtual memory address that corresponds to an address of a memory page in virtual memory of guest operating system 112. In another example, data storage location 116 may be a memory address of the virtual machine that identifies a memory location that is perceived by the virtual machine to be a physical memory address but is actually a logical location provided by or emulated by the hypervisor (e.g., pseudo-physical address). In either example, the data storage location 116 may accessible by virtual processors 117A-C.

Virtual processors 117A-C may be virtual devices capable of accessing and executing instructions within data storage 114. The instructions may encode arithmetic, logical, or I/O instructions and may be the same or similar to instruction 113. Each of the virtual processors 117A-C may represent a portion of an underlying physical processor present in computing system 100 (e.g., processor 132A) or may be partially or fully emulated by hypervisor 120. Virtual processors 117A-C may appear to be single core processors, which may be capable of executing one instruction at a time (e.g., single pipeline of instructions) or appear to be a multi-core processor, which may simultaneously execute multiple instructions. In one example, virtual processors 117A-C may be a virtual central processing units (vCPU). As shown in FIG. 1, virtual processors 117A-C may be associated with respective instruction pointers 118A-C and respective monitoring state indicators 119A-C.

Instruction pointers 118A-C may indicate an instruction that was or will be executed by the respective virtual processor. An instruction pointer may point to the current instruction, the previous instruction, the next instruction, other instruction, or a combination thereof. Each of the instruction pointers 118A-C may include identification data that is the same or similar to a data storage location. In some instances, instruction pointers 118A-C may point to the same location as data storage location 116 and may therefore indicate that the respective virtual processor previously executed instruction 113.

Monitoring state indicators 119A-C may be associated with a virtual processor and may indicate the monitoring state of the virtual processor. Monitoring state indicators 119A-C may indicate whether the respective virtual processor is monitoring a predetermined storage region. The predetermined storage region may include one or more processor registers, portions of memory, portions of a mass storage device, other storage location, or a combination thereof. As discussed above, a virtual or physical processor may monitor the storage region and other processors may modify the predetermined storage region as a form of inter-processor communication. This may be advantageous because it may enable inter-process communication without the use of inter-processor interrupts (IPIs).

Monitoring state indicator 119A may represent one of a plurality of different monitoring states to other virtual processors (e.g., virtual processor 117B and 117A). A first monitoring state may represent that virtual processor 117A is monitoring the predetermined storage region and may correspond to a polling state or an idle state because virtual processor 117A may be polling the predetermined storage region and not performing any other computing tasks. A second monitoring state may correspond to a non-monitoring state where the virtual processor is not monitoring the predetermined storage region. Other states may or may not be present and reflected by monitoring state indicator 119A. In one example, monitoring state indicator 119A may be a flag (e.g., bit flag) that represents one of two monitoring states (e.g., monitoring and non-monitoring). Monitoring state indicator 119A may be inspected and modified by other virtual processors and by hypervisor 120.

Hypervisor 120 may also be known as a virtual machine monitor (VMM) and may provide one or more virtual machines 110 with direct or emulated access to hardware resources 130. In the example shown, hypervisor 120 may run directly on the hardware of computing system 100 (e.g., bare metal hypervisor). In other examples, hypervisor 120 may run on or within a host operating system (not shown). Hypervisor 120 may manage system resources, including access to hardware resources 130. Hypervisor 120, though typically implemented as executable code, may emulate and export a bare machine interface to higher-level executable code in the form of virtual processors 117A-C and data storage 114 (e.g., guest memory). Higher-level executable code may comprise a standard or real-time operating system (OS), may be a highly stripped down operating environment with limited operating system functionality and may not include traditional OS facilities, etc. Hypervisor 120 may support any number of virtual machines (e.g., a single VM, one hundred VMs, etc.). In the example shown, hypervisor 120 may include an optimization initialization component 122, a VM transition analysis component 124, and a transition response component 126.

Components 122, 124, and 126 may enable hypervisor 120 to determine whether virtual machine 110 transitioned execution to hypervisor 120 by executing a particular instruction. Each of the components may be separated into one or more components or may be included within the same component. Optimization initialization component 122 may enable hypervisor 120 to interact with virtual machine 110 to identify a data storage location 116 of a particular instruction (e.g., instruction 113). The particular instruction may be an instruction that initiates memory monitoring (e.g., MWAIT hardware instruction). VM transition analysis component 124 may enable hypervisor 120 to detect that the virtual machine 110 transitioned execution to the hypervisor and to analyze and compare the data storage location of the instruction with the instruction pointer of a virtual processor of the virtual machine. Transition response component 126 may enable hypervisor 120 to respond to the transition with one or more operations that alter the state of the virtual machine, hypervisor, or a hardware resource to optimize the execution of computing system 100. In the example shown in FIG. 1, the transition analyzed by the components of the hypervisor 120 is the result of a transition event 128.

Transition event 128 may represent the transition of a processor 132A from executing virtual machine 110 to executing hypervisor 120. Transition event 128 may be caused by an operation of virtual machine 110, guest operating system 112, hypervisor 120, hardware resources 130, or a combination thereof. In one example, guest operating system 112 may execute an instruction that voluntarily transitions execution from a computing process of guest operating system 112 to a computing process of hypervisor 120. In another example, guest operating system 112 may execute an instruction that involuntarily transitions execution from the computing process of guest operating system 112 to the computing process of hypervisor 120. The involuntary transition may occur when the underlying hardware is unable to process the instruction and may transition to the hypervisor so that the hypervisor can perform an action in response to the instruction. In either example, transition event 128 may mark the point at which a transition is made and may be represented by one or more transition event data structures.

The one or more transition event data structures may be updated by an underlying processor to include transition information associated with transition event 128. The transition information may correspond to the virtual machine, hypervisor, or host machine and may include state data, reason data, other data, or a combination thereof. The state data may include a snapshot of data of the physical or virtual processor as it was running at the time of transition event 128. The state data may include data of control registers, debug registers, machine specific registers, segment registers, descriptor-table registers, instruction pointers, other data, or a combination thereof. The reason data may include a numeric or non-numeric reason for the transition. The reason data may provide a reason code but the reason code may be general. The technology disclosed herein may be advantageous because it may enhance the ability of the hypervisor to determine the instruction associated with the transition event, which may provide valuable insight as to the cause of the transition event.

Hardware resources 130 may provide hardware features for performing computing tasks. In one example, one or more of the hardware resources may correspond to a physical device of computing system 100. In another example, one or more of the hardware resources may be provided by hardware emulation and the corresponding physical device may be absent from computing system 100. For example, computing system 100 may be a server machine that does not include a graphics device (e.g., graphics card) or includes a graphics device that does not support a particular hardware feature. Hypervisor 120 may provide the hardware feature of the hardware resource by emulating a portion of the hardware resource (e.g., provide a virtualized graphics device). The emulation of a portion of a hardware resource may be provided by hypervisor 120, virtual machine 110, host operating system (not shown), another hardware resource, or a combination thereof.

In the example shown in FIG. 1, hardware resources 130 may include a processor 132A, a storage device 132B, a network interface device 132C, a graphics device 132D, other physical or emulated devices, or combination thereof. Processor 132A may refer to devices capable of executing instructions encoding arithmetic, logical, or I/O operations. Processor 132A may be a single core processor, which may be capable of executing one instruction at a time (e.g., single pipeline of instructions) or a multi-core processor, which may simultaneously execute multiple instructions. Storage device 132B may include any data storage that is capable of storing digital data, such as physical memory devices including volatile memory devices (e.g., RAM), non-volatile memory devices (e.g., NVRAM), other types of memory devices, or a combination thereof. Storage device 132B may include mass storage devices, such as solid-state storage (e.g., Solid State Drives (SSD)), hard drives, other persistent data storage, or a combination thereof. Network interface device 132C may provide access to a network internal to the computing system 100 or external to the computing system 100 (e.g., network 140) and in one example may be a network interface controller (NIC). Graphics device 132D may provide graphics processing for the computing system 100 and/or one or more of the virtual machines 110. One or more of the hardware resources 130 may be combined or consolidated into one or more physical devices or may partially or completely emulated by hypervisor 120 as a virtual device.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
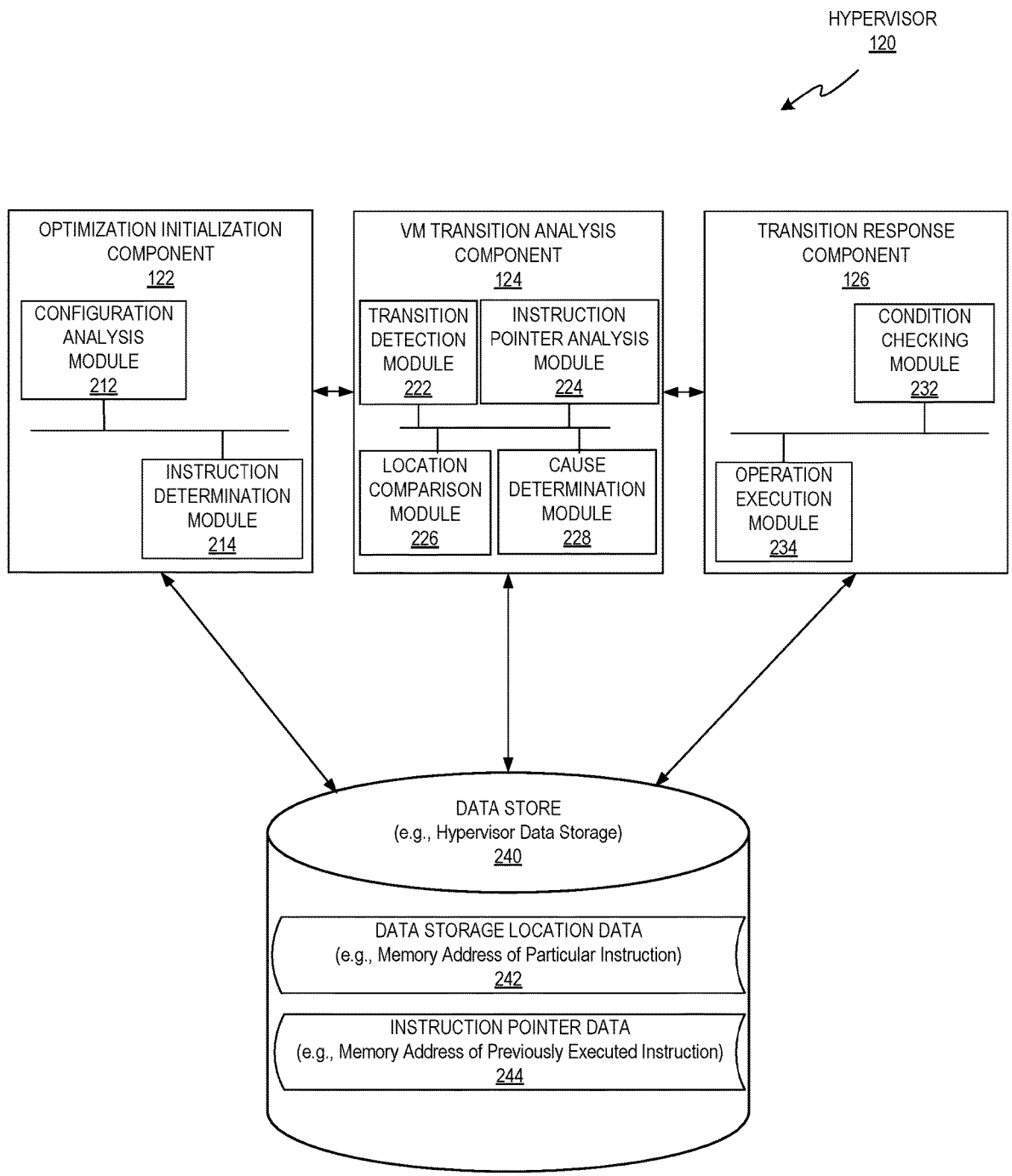
FIG. 2 depicts a block diagram illustrating components and modules of an example hypervisor, in accordance with one or more aspects of the present disclosure.

FIG. 2 depicts a block diagram illustrating an exemplary hypervisor 120 that includes technology for determining a cause of a transition event based on the data storage location of a particular guest instruction, in accordance with one or more aspects of the present disclosure. Hypervisor 120 may be the same or similar to hypervisor of FIG. 1 and may include an optimization initialization component 122, a VM transition analysis component 124, a transition response component 126, and a data store 240. The components and modules discussed herein may be performed by any portion of hypervisor 120 or by a guest operating system, virtual machine, host operating system, other portion of a computing system, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Referring now to FIG. 2, optimization initialization component 122 may enable hypervisor 120 to interact with a virtual machine to configure an optimization that enables the hypervisor detect the guest instruction that caused a transition event. In one example, optimization initialization component 122 may include a configuration analysis module 212 and an instruction determination module 214.

Configuration analysis module 212 may determine whether the configuration of a computing system supports the optimization. As discussed above, the optimization may involve comparing guest data storage locations to determine whether the previously executed instruction matches an instruction that is known to cause transition events. The comparison may depend on a premise that a particular data storage location points to a particular instruction, however this may not apply in certain configurations. For example, in certain configurations the virtual memory address space of a guest operating system may be replaced during operation. This may result in a particular guest data storage location (e.g., virtual memory address) resolving to multiple different instructions. This may adversely affect the optimization because matching data storage locations may or may not correspond to a particular instruction. Configuration analysis module 212 may analyze configuration criteria that indicate a chance that a particular data storage location may resolve to multiple different instructions. The configuration criteria may be related to the size of the data storage address space such as whether a reduced size mode (e.g., 32 bit mapping mode) is enabled by the virtual processor, the virtual machine, the guest operating system, or a combination thereof.

The features of configuration analysis module 212 may be performed by the hypervisor, a guest operating system, host operating system, or a combination thereof. In one example, features of configuration analysis module 212 may be performed exclusively by a guest operating system. The guest operating system may perform the analysis of the configuration(s) and indicate to the hypervisor whether the optimization is or is not supported. The indication may involve the guest operating system sending a signal, updating a storage location, other action, or a combination thereof. In another example, configuration analysis module 212 may be performed exclusively by the hypervisor or by a combination of the hypervisor and the guest operating system. In either example, configuration analysis module 212 may analyze a configuration of the guest operating system, the virtual machine, the hypervisor, the host operating system, one or more hardware resources, or a combination thereof. Configuration analysis module 212 may execute before, during, or after an initialization of the guest operating system and may also or alternatively execute after a transition event has occurred as will be discussed below.

Instruction determination module 214 may enable hypervisor 120 to determine the data storage location of a particular instruction of a guest operating system that may be known to cause a transition event. In one example, the hypervisor may determine the data storage location by receiving the data storage location from the guest operating system. The data storage location may be received before, during, or after an initialization of the guest operating system or a module of the guest operating system (e.g., kernel module). In another example, the hypervisor may determine the data storage location of the particular instruction without receiving it from the guest operating system. In which case, the hypervisor may determine the data storage location by analyzing the guest data storage, storage access patterns, other information, or a combination thereof. In either example, the instruction determination module 214 may store the data storage location as data storage location data 242 in data store 240.

Data store 240 may be any storage portion that is modifiable by hypervisor 120 and may include a storage unit of hypervisor storage. The data storage location data 242 stored within data store 240 may indicate a plurality of data storage locations and each of the plurality of data storage locations may correspond to an instance of the particular instruction within the guest operating system. In one example, data storage location data 242 may indicate one or more memory locations of the particular instruction. The memory locations may be within a portion of memory that was allocated by the hypervisor to the virtual machine and is managed by the guest operating system. The particular instruction may be a memory monitoring instruction of the guest operating system that may be executed by the virtual processor to cause the virtual processor to initiate memory monitoring. In one example, the memory monitoring instruction executed by the virtual processor may be a hardware instruction (e.g., MWAIT) of the instruction set architecture (ISA) of the virtual processor.

VM transition analysis component 124 may enable hypervisor 120 to determine whether a particular instruction of a guest operating system caused a processor to transition execution to hypervisor 120. In one example, VM transition analysis component 124 may include a transition detection module 222, an instruction pointer analysis module 224, a location comparison module 226, and a cause determination module 228.

Transition detection module 222 may enable the hypervisor to detect an occurrence of a transition event that transitions execution of a physical processor from the virtual machine to the hypervisor. During standard operation, the physical processor may transition execution back-and-forth between the virtual machine, hypervisor, guest operating system and not all transitions may be caused by transition event 128. Transition event 128 may be a specific transition that switches execution from the virtual machine to the hypervisor. The transition event 128 may represent a forced transition of a physical processor from executing a virtual machine to executing the hypervisor. When a transition event 128 occurs, hypervisor 120 may begin executing and may use transition detection module 222 to access (e.g., check) one or more storage areas to determine whether a transition event 128 occurred. The storage area may include one or more processor storage units (e.g., processor registers), memory storage units (e.g., memory pages), disk storage units (e.g., blocks or files), or a combination thereof. Data within the storage area may indicate the existence and/or location of one or more transition event data structures. The transition event data structures are discussed above and may include transition information associated with transition event 128. The transition information may correspond to the virtual machine, hypervisor, or host machine and may include state data, reason data, other data, or a combination thereof. Transition detection module 222 may analyze the data within the storage area and/or the transition information to determine whether the current execution of the hypervisor is the result of a specific transition event (e.g., a VM Exit). This may involve identifying the guest operating system, virtual machine, or virtual processor that was previously executed.

Instruction pointer analysis module 224 may enable the hypervisor to inspect the instruction pointer of the virtual processor to identify an instruction of the guest operating system that was or will be executed by the virtual processor. The virtual processor may be virtualized or emulated form of a physical processor and may be represented by a data structure accessible to hypervisor 120. Therefore, hypervisor 120 may inspect the instruction pointer of the virtual processor without transitioning execution back to the virtual machine that contains the virtual processor. The instruction pointer may indicate (e.g., point to) a current instruction, a previous instruction, a next instruction, other instruction, or a combination thereof. The indication may be in the form of identification data that identifies a data storage location within guest data storage. Hypervisor 120 may store the identification data of the instruction pointer in data store 240 as instruction pointer data 244. In one example, instruction pointer data 244 may include a data storage location (e.g., memory address) within virtual memory of the guest operating system managed by hypervisor 120.

Location comparison module 226 may compare instruction pointer data 244 and data storage location data 242 to determine if they correspond to the same instruction. As discussed above, instruction pointer data 244 may indicate a data storage location of a previously executed instruction and comparing the instruction pointer data 244 and the data storage location data 242 may involve a comparison of two data storage locations. In one example, the instruction pointer data associated with the virtual processor may include a first guest virtual memory address and data storage location 116 of the instruction (e.g., MWAIT) may be a second guest virtual memory address. In this case, the location comparison module 226 may enable the hypervisor to perform a comparison between the first guest virtual memory address and the second guest virtual memory address to determine whether they match.

The comparison may indicate whether the two data storage locations correspond to the same storage location that stores a particular instruction. In one example, the data storage location of the instruction pointer and the data storage location of the particular instruction may both be memory addresses of an address space separate from or unknown to the hypervisor. In another example, the hypervisor may be aware of the address space and may resolve the one or more data storage locations to a location of an alternate address space before, during, or after the comparison. Location comparison module 226 may use one or more data structures (e.g., translation lookaside buffer (TLB)) of the guest operating system or hypervisor to translate a data storage location to an alternate address space. As discussed above, each of the data storage locations may be a virtual address, a logical address, or a physical address and may correspond to an address space of a guest operating system, a virtual machine, a hypervisor, a host operating system, or a combination thereof. In one example, location comparison module 226 may translate a guest virtual address to a guest physical address (i.e., pseudo-physical address) or may translate a guest physical address to a guest virtual address.

Cause determination module 228 may access the results of the data storage location comparison module 226 to determine the cause of the transition event. In one example, the data storage location of the instruction may include a plurality of data storage locations and indicate a particular instruction that may be located in multiple different portions of a guest operating system. If the instruction pointer matches at least one of the plurality of data storage locations, then the instruction previously executed by the virtual processor was the particular instruction (e.g., MWAIT). This may enable the cause determination module 228 to associate the transition event with the particular instruction that caused its occurrence. This may be advantageous because although the transition event may be associated with a reason code the reason code may not indicate the guest instruction that caused the transition event. Identifying the instruction of the guest operating system that caused the transition event may provide additional execution details to the transition response component 126.

Transition response component 126 may enable hypervisor 120 to respond to the transition event with one or more operations that alter the state of the virtual machine, hypervisor, or a hardware resource to optimize the execution of computing system 100. In one example, transition response component 126 may include a condition checking module 232 and an operation execution module 234.

Condition checking module 232 may check one or more conditions to determine whether the hypervisor's optimization operation is appropriate for the computing system. Prior to executing the optimization operation, hypervisor 120 may check one or more conditions to determine if they are satisfied. A first condition may relate to the instruction that was previously executed by the virtual processor and whether the previously executed instruction matches an instruction that initiates memory monitoring. Condition checking module 232 may determine the first condition is satisfied in view of the results of cause determination module 228 (e.g., MWAIT was the previously executed instruction). A second condition may relate to the current memory monitoring state of the virtual processor and may involve accessing the memory monitoring state of the virtual processor, as discussed above. Condition checking module 232 may determine the second condition is satisfied when the memory monitoring state indicates the virtual processor is monitoring a predetermined storage region. A third condition may relate to whether the virtual processor is in a privileged guest execution mode. Condition checking module 232 may inspect the virtual processor to determine the virtual processor was associated with a privileged guest execution mode (e.g., kernel mode) when it executed the most recent instruction. When one or more of the conditions are satisfied, the condition checking module 232 may signal the operation execution module 234.

Operation execution module 234 may enable the hypervisor to execute one or more operations in view of the cause of the transition event. The operation may modify any portion of the computing system and may enhance the virtualization technology (e.g., reduce computing resource consumption). The operation may involve modifying the configuration of an object of the computing system. The object may be a virtual or physical object such as a device (e.g., virtual processor, physical processor), a communication channel (e.g., virtual or physical interconnect, bus, or network connection), storage location (e.g., processor register, memory page, file), a data structure (e.g., locking data structure), other object, or a combination thereof. In one example, the hypervisor may modify the configuration of the virtual processor to reduce the physical processor cycles consumed to sustain the virtual processor.

In one example, a transition event may be caused by a virtual processor initiating a memory monitoring feature and the hypervisor may execute one or more operations to reconfigure the virtual processor and put it into a sleep state. The configuration operation may involve the hypervisor modifying (e.g., clearing) the monitoring state indicator to indicate to other virtual processors that the virtual processor is no longer monitoring memory. In one example, the hypervisor may check the status of the monitoring state indicator and modify the monitoring state indicator in a single atomic operation. The single atomic operation may read an original value, change the value (e.g., set to 0), and then return the original value of the monitoring state indicator. Changing the monitoring state indicator of the virtual processor may cause other virtual processors to avoid other processors from relying on the memory monitoring features to perform inter-processor communications and may cause the other virtual processors to use inter-processor interrupts. The hypervisor may listen for the inter-processor interrupts and avoid executing the virtual processor to perform the wasted memory monitoring (e.g., polling activity). The sleep state operation may be an operation initiated by hypervisor to alter the sleep state of the virtual processor. Altering the sleep state may cause the virtual processor to switch to a lower power consumption state to improve the overall power efficiency of the system and in some examples may involve completely stopping, halting, or unplugging the virtual processor.

Figure 3:
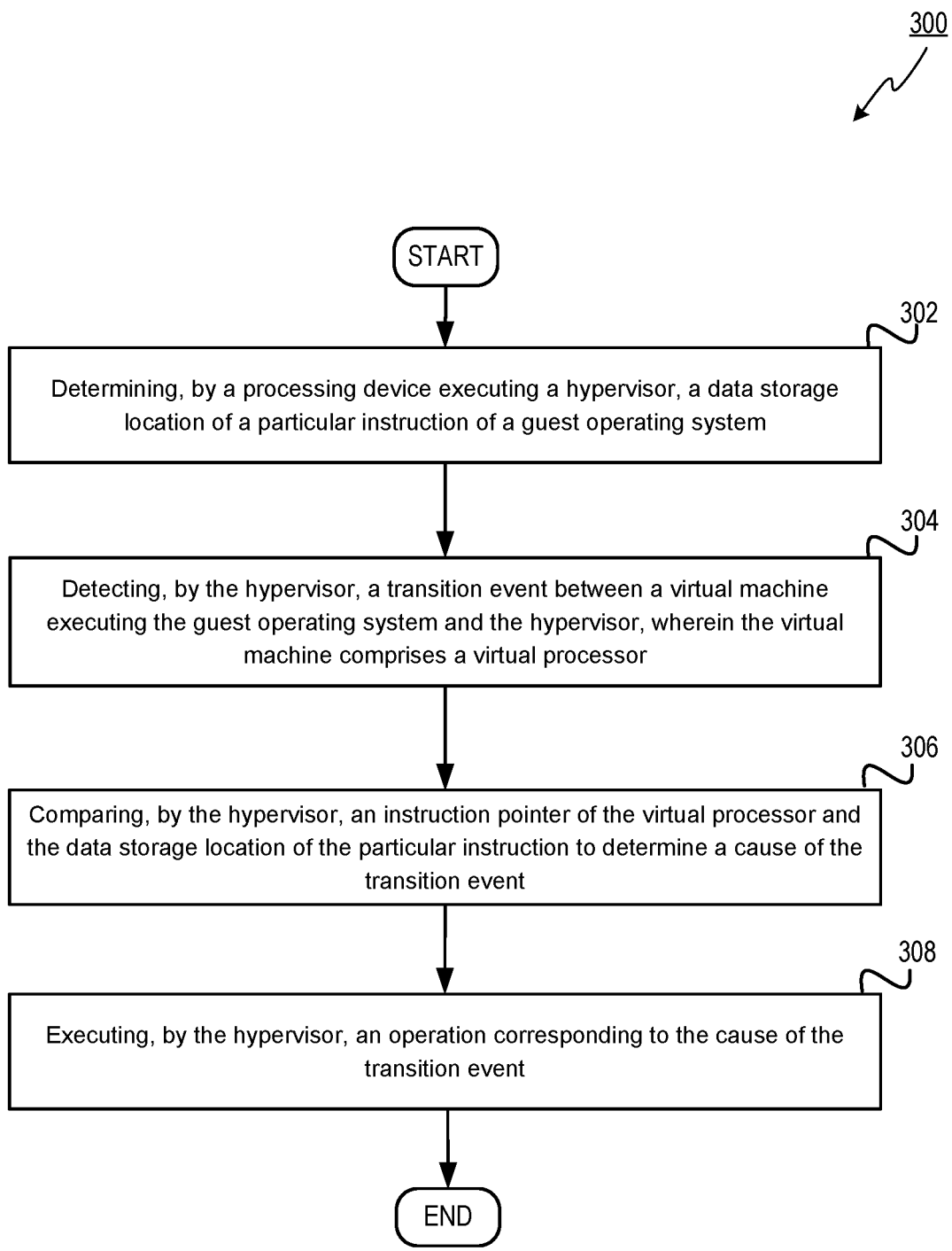
FIG. 3 depicts a flow diagram of an example method for enabling a hypervisor to determine the guest instruction that caused a transition event, in accordance with one or more aspects of the present disclosure.

FIG. 3 depicts a flow diagram of an illustrative example of a method 300 that enables a hypervisor to determine the instruction executed by the virtual machine that caused a transition event, in accordance with one or more aspects of the present disclosure. Method 300 and each of its individual functions, routines, subroutines, or operations may be performed by one or more processors of a computer device executing the method. In certain implementations, method 300 may be performed by a single processing thread of a hypervisor. Alternatively, methods 300 may be performed by two or more processing threads executing on the computer device and each thread may execute one or more individual functions, routines, subroutines, or operations of the method. In an illustrative example, the processing threads implementing methods 300 may be synchronized (e.g., using critical sections, semaphores, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by hypervisor 120 of FIGS. 1 and 2 and may begin at block 302.

At block 302, the processing device executing a hypervisor may determine a data storage location of a particular instruction of a guest operating system. Determining the data storage location of the particular instruction may involve the hypervisor receiving the data storage location from the guest operating system during an initialization of the guest operating system. The data storage location may indicate a memory location of the particular instruction within memory managed by the guest operating system. In one example, the data storage location of the particular instruction may include a plurality of data storage locations and each of the plurality of data storage locations may correspond to an instance of the particular instruction within the guest operating system.

At block 304, the processing device executing the hypervisor may detect a transition event between a virtual machine executing the guest operating system and the hypervisor. The virtual machine may include one or more virtual processors that are associated with one or more physical processors. The transition event may represent a force transition of a physical processor from executing a virtual processor of the virtual machine to executing the hypervisor. The virtual processor may include or be associated with a processor flag capable of indicating a memory monitoring state of the virtual processor to one or more other virtual processors. The memory monitoring state may represent whether the virtual processor detects an inter-processor communication in the absence of an inter-processor interrupt by using memory monitoring (e.g., detecting the presence of a memory modification). When the memory monitoring state is active, the virtual processor may be capable of detecting an inter-processor communication initiated by another virtual processor in the absence of an inter-processor interrupt.

At block 306, the processing device executing the hypervisor may compare an instruction pointer of the virtual processor and the data storage location of the particular instruction to determine a cause of the transition event. The instruction pointer of the virtual processor may indicate a data storage location of a previously executed instruction. The comparison may involve determining that the data storage location of the previously executed instruction matches the data storage location of the particular instruction. In one example, the instruction pointer of the virtual processor may include a first guest virtual memory address and the data storage location of the particular instruction may include a second guest virtual memory address. In which case, the comparison may involve the hypervisor comparing the first guest virtual memory address with the second guest virtual memory address.

At block 308, the processing device may execute an operation that corresponds to the cause of the transition event. The particular instruction of the guest operating system may be a memory monitoring instruction executed by the virtual processor. The hypervisor may respond to the transition event that originated from a memory monitoring instruction by executing an operation that sets the virtual processor to a sleep state. In one example, the execution of the operation setting the virtual processor to a sleep state may be in response to both the virtual processor being in a memory monitoring state and the instruction pointer indicating the previously executed instruction was the memory monitoring instruction. The hypervisor may determine the memory monitoring state by checking the memory monitoring state indicator of the virtual processor. The hypervisor may then modify the memory monitoring state indicator of the virtual processor to indicate that the virtual processor is no longer monitoring a predetermined storage region. Modifying the memory monitoring state of the virtual processor may enable other virtual processors to detect the virtual processor is not monitoring memory and cause the other virtual processors to initiate an inter-processor interrupt. In one example, the other virtual processors may check and modify the memory monitoring indicator of the virtual processor in a single atomic operation to indicate work is available (e.g., work is in the queue of the virtual processor). Responsive to completing the operations described herein above with references to block 308, the method may terminate.

Figure 4:
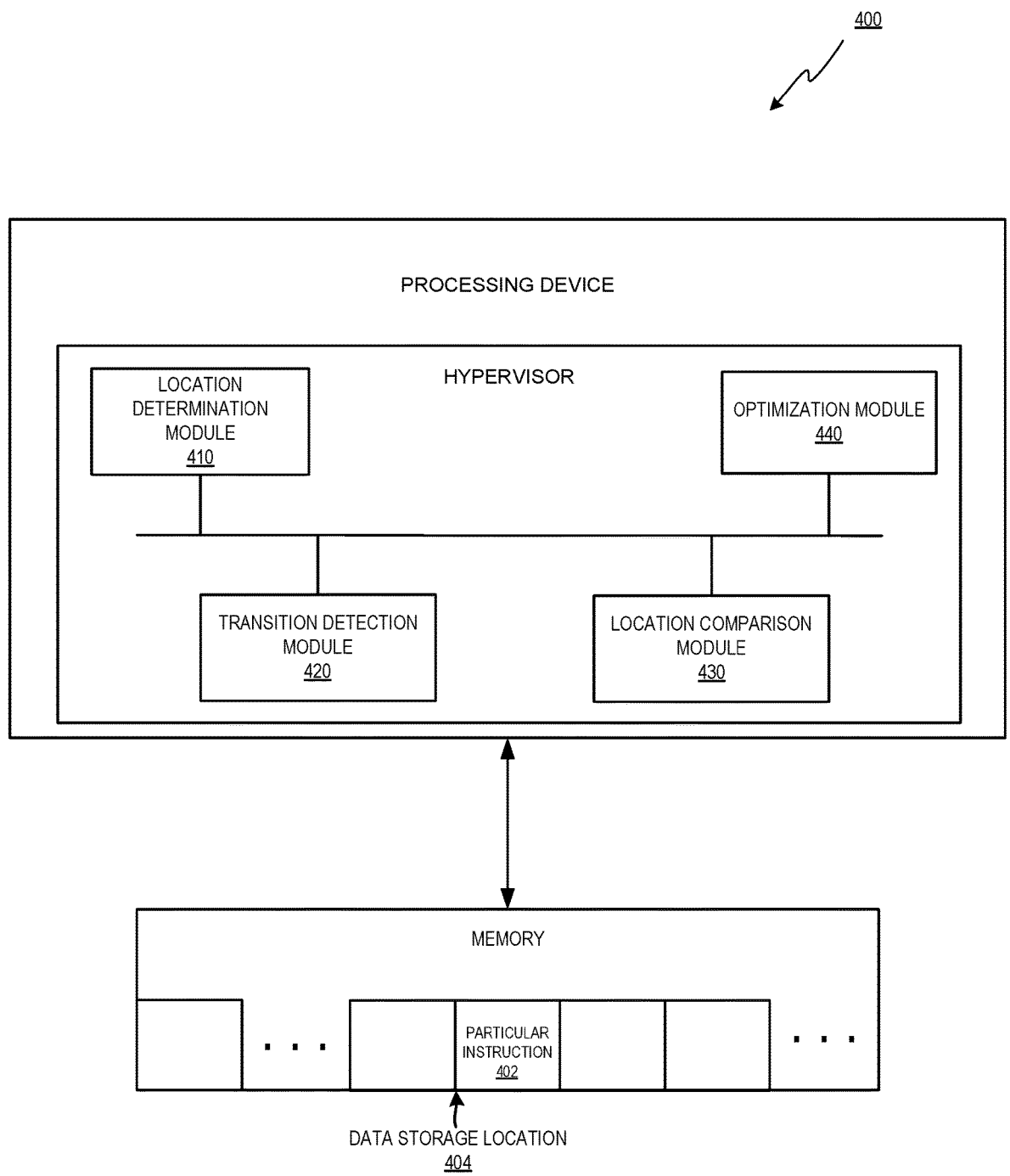
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computing system 100 of FIG. 1 and may include one or more processing devices and one or more memory devices. In the example shown, computer system 400 may include a location determination module 410, a transition detection module 420, a location comparison module 430, and an optimization module 440.

Location determination module 410 may enable a processing device executing a hypervisor to determine a data storage location of a particular instruction 402 of a guest operating system. Determining the data storage location 404 of particular instruction 402 may involve the hypervisor receiving data storage location 404 from the guest operating system during an initialization of the guest operating system. Data storage location 404 may indicate a memory location of particular instruction 402 within memory managed by the guest operating system. In one example, data storage location 404 of particular instruction 402 may include a plurality of data storage locations and each of the plurality of data storage locations may correspond to an instance of the particular instruction 402 within the guest operating system.

Transition detection module 420 may enable the processing device executing the hypervisor to detect a transition event between a virtual machine executing the guest operating system and the hypervisor. The virtual machine may include one or more virtual processors that are associated with one or more physical processors. The transition event may represent a force transition of a physical processor from executing a virtual processor of the virtual machine to executing the hypervisor. The virtual processor may include or be associated with a processor flag capable of indicating a memory monitoring state of the virtual processor to one or more other virtual processors. The memory monitoring state may represent whether the virtual processor detects an inter-processor communication in the absence of an inter-processor interrupt by using memory monitoring (e.g., detecting the presence of a memory modification). When the memory monitoring state is active, the virtual processor may be capable of detecting an inter-processor communication initiated by another virtual processor in the absence of an inter-processor interrupt.

Location comparison module 430 may enable the processing device executing the hypervisor to compare an instruction pointer of the virtual processor and the data storage location of the particular instruction 402 to determine a cause of the transition event. The instruction pointer of the virtual processor may indicate a data storage location of a previously executed instruction. The comparison may involve determining that the data storage location of the previously executed instruction matches data storage location 404 of the particular instruction 402. In one example, the instruction pointer of the virtual processor may include a first guest virtual memory address and the data storage location 404 of particular instruction 402 may include a second guest virtual memory address. In which case, the comparison may involve the hypervisor comparing the first guest virtual memory address with the second guest virtual memory address.

Optimization module 440 may enable the processing device executing the hypervisor to execute an operation that corresponds to the cause of the transition event. The particular instruction 402 of the guest operating system may be a memory monitoring instruction executed by the virtual processor. The hypervisor may respond to the transition event that originated from a memory monitoring instruction by executing an operation that sets the virtual processor to a sleep state. In one example, the execution of the operation setting the virtual processor to a sleep state may be in response to both the virtual processor being in a memory monitoring state and the instruction pointer indicating the previously executed instruction was the memory monitoring instruction. The hypervisor may determine the memory monitoring state by checking the memory monitoring state indicator of the virtual processor. The hypervisor may then modify the memory monitoring state indicator of the virtual processor to indicate that the virtual processor is no longer monitoring a predetermined storage region. Modifying the memory monitoring state of the virtual processor may enable other virtual processors to detect the virtual processor is not monitoring memory and cause the other virtual processors to initiate an inter-processor interrupt. In one example, the other virtual processors may check and modify the memory monitoring indicator of the virtual processor in a single atomic operation to indicate work is available (e.g., work is in the queue of the virtual processor).

Figure 5:
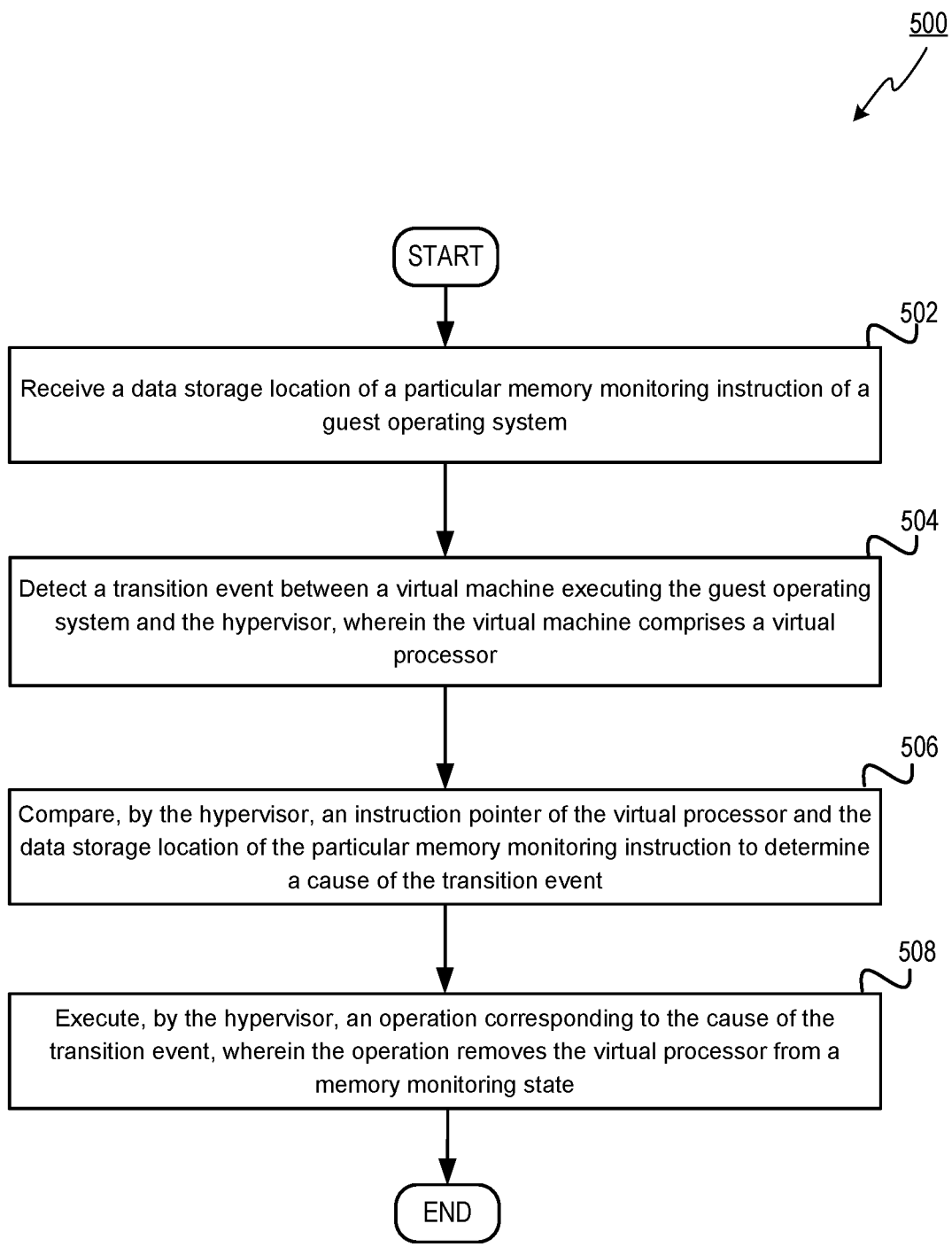
FIG. 5 depicts a flow diagram of another example method for enabling a hypervisor to determine the guest instruction that caused a transition event, in accordance with one or more aspects of the present disclosure.

FIG. 5 depicts a flow diagram of an illustrative example of a method 500 that enables a hypervisor to determine the instruction executed by the virtual machine that caused a transition event, in accordance with one or more aspects of the present disclosure. Method 500 may be similar to method 300 and may be performed in the same or a similar manner as described above in regards to FIG. 3. Method 500 may be performed by processing devices of a server device or a client device and may begin at block 502.

At block 502, the processing device executing a hypervisor may receive a data storage location of a particular memory monitoring instruction of a guest operating system. The hypervisor may receive the data storage location from the guest operating system during an initialization of the guest operating system. The data storage location may indicate a memory location of the particular memory monitoring instruction within memory managed by the guest operating system. In one example, the data storage location of the particular memory monitoring instruction may include a plurality of data storage locations and each of the plurality of data storage locations may correspond to an instance of the particular memory monitoring instruction within the guest operating system.

At block 504, the processing device executing the hypervisor may detect a transition event between a virtual machine executing the guest operating system and the hypervisor. The virtual machine may include one or more virtual processors that are associated with one or more physical processors. The transition event may represent a force transition of a physical processor from executing a virtual processor of the virtual machine to executing the hypervisor. The virtual processor may include or be associated with a processor flag capable of indicating a memory monitoring state of the virtual processor to one or more other virtual processors. The memory monitoring state may represent whether the virtual processor detects inter-processor communication in the absence of an inter-processor interrupt by using memory monitoring (e.g., detecting the presence of a memory modification). When the memory monitoring state is active, the virtual processor may be capable of detecting an inter-processor communication initiated by another virtual processor in the absence of an inter-processor interrupt.

At block 506, the processing device executing the hypervisor may compare an instruction pointer of the virtual processor and the data storage location of the particular memory monitoring instruction to determine a cause of the transition event. The instruction pointer of the virtual processor may indicate a data storage location of a previously executed instruction. The comparison may involve determining that the data storage location of the previously executed instruction matches the data storage location of the particular memory monitoring instruction. In one example, the instruction pointer of the virtual processor may include a first guest virtual memory address and the data storage location of the particular memory monitoring instruction may include a second guest virtual memory address. In which case, the comparison may involve the hypervisor comparing the first guest virtual memory address with the second guest virtual memory address.

Figure 6:
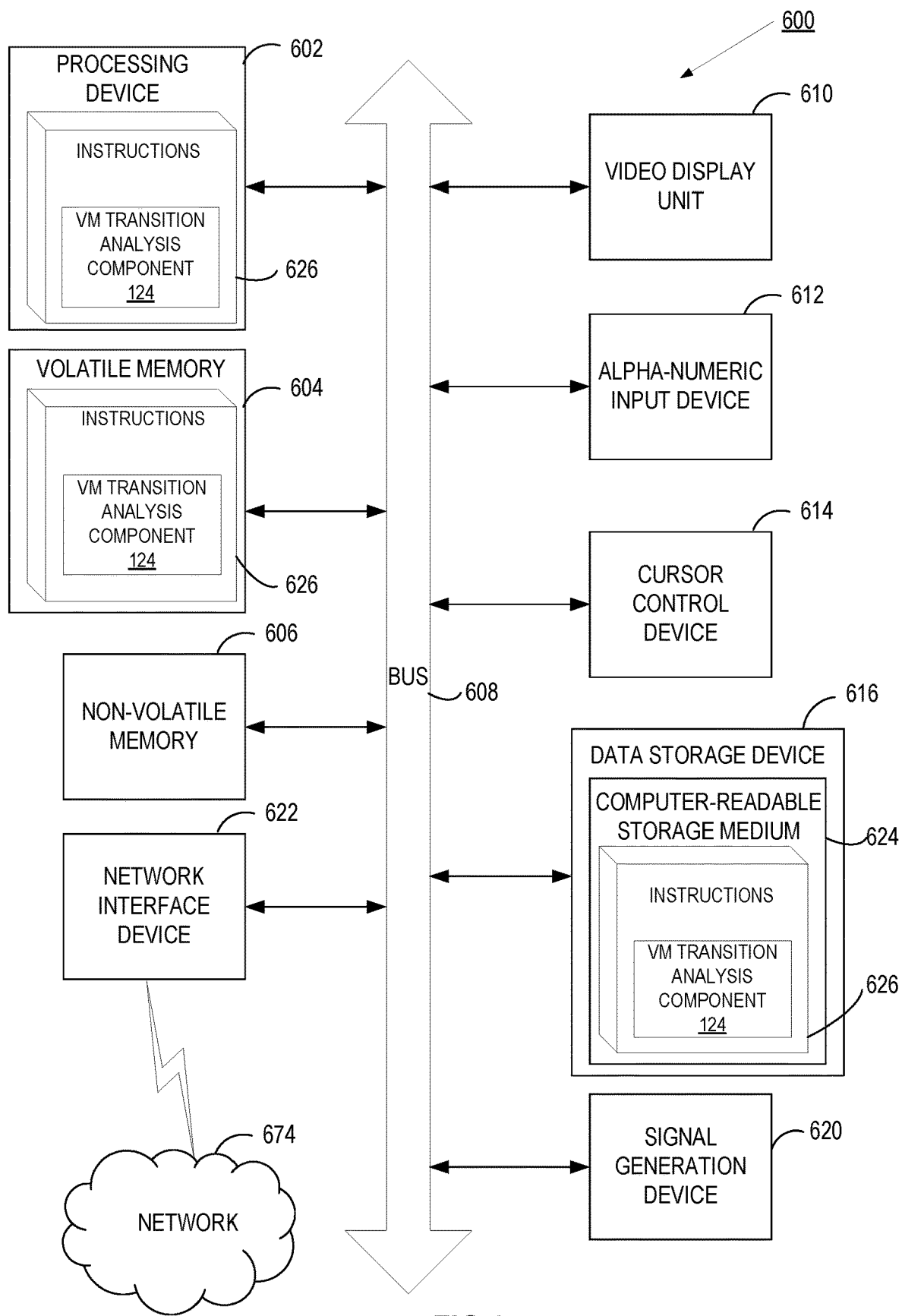
FIG. 6 depicts a block diagram of an illustrative computing device operating in accordance with the examples of the present disclosure.

At block 508, the processing device may execute an operation that corresponds to the cause of the transition event. The particular memory monitoring instruction of the guest operating system may be a memory monitoring instruction executed by the virtual processor. The hypervisor may respond to the transition event that originated from a memory monitoring instruction by executing an operation that sets the virtual processor to a sleep state. In one example, the execution of the operation setting the virtual processor to a sleep state may be in response to both the virtual processor being in a memory monitoring state and the instruction pointer indicating the previously executed instruction was the memory monitoring instruction. The hypervisor may determine the memory monitoring state by checking the memory monitoring state indicator of the virtual processor. The hypervisor may then modify the memory monitoring state indicator of the virtual processor to indicate that the virtual processor is no longer monitoring a predetermined storage region. Modifying the memory monitoring state of the virtual processor may enable other virtual processors to detect the virtual processor is not monitoring memory and cause the other virtual processors to initiate an inter-processor interrupt. In one example, the other virtual processors may check and modify the memory monitoring indicator of the virtual processor in a single atomic operation to indicate work is available (e.g., work is in the queue of the virtual processor). Responsive to completing the operations described herein above with references to block 508, the method may terminate FIG. 6 depicts a block diagram of a computer system operating in accordance with one or more aspects of the present disclosure. In various illustrative examples, computer system 600 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for resource request component 222 of FIGS. 1 and 2.

Instructions 626 may also reside, completely or partially, within volatile memory 604 and/or within processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    determining, by a processing device executing a hypervisor, a data storage location for a particular instruction of a guest operating system;

detecting, by the hypervisor, a transition event caused by the particular instruction to transition between a virtual machine executing the guest operating system and the hypervisor, wherein the virtual machine comprises a virtual processor;

comparing, by the hypervisor, an instruction pointer of the virtual processor and the data storage location of the particular instruction to determine a cause of the transition event, wherein a match between a value of the instruction pointer and at least one value of the data storage location indicates that an instruction executed by the virtual processor is the particular instruction which caused the transition event; and executing, by the hypervisor, an operation in response to the transition event and corresponding to the cause of the transition event, the operation comprising a modification of a memory monitoring state of the virtual processor, the memory monitoring state indicating whether the virtual processor is configured to monitor a predetermined storage.

2. The method of claim 1, wherein determining the data storage location of the particular instruction comprises the hypervisor receiving the data storage location from the guest operating system during an initialization of the guest operating system, wherein the data storage location indicates a memory location of the particular instruction within memory managed by the guest operating system.

3. The method of claim 1, wherein the data storage location of the particular instruction comprises a plurality of data storage locations and each of the plurality of data storage locations corresponds to an instance of the particular instruction within the guest operating system.

4. The method of claim 1, wherein the transition event represents a force transition of a physical processor from executing a virtual machine to executing the hypervisor.

5. The method of claim 1, wherein the instruction pointer of the virtual processor indicates a data storage location of a previously executed instruction and wherein the comparing comprises determining that the data storage location of the previously executed instruction matches the data storage location of the particular instruction.

6. The method of claim 1, wherein the instruction pointer of the virtual processor comprises a first guest virtual memory address and wherein the data storage location of the particular instruction comprises a second guest virtual memory address, and wherein the comparing comprises the hypervisor comparing the first guest virtual memory address with the second guest virtual memory address.

7. The method of claim 1, wherein the modification of the memory monitoring state of the virtual processor enables one or more virtual processors to detect the virtual processor is not monitoring the predetermined storage region and causes the one or more virtual processors to initiate an inter-processor interrupt.

8. The method of claim 1, wherein the virtual processor comprises a processor flag indicating the memory monitoring state of the virtual processor to other virtual processors, wherein the memory monitoring state represents whether the virtual processor is capable of detecting inter-processor communication using memory monitoring in the absence of an inter-processor interrupt.

9. The method of claim 1, wherein executing the operation is in response to the instruction pointer of the virtual processor indicating a previously executed instruction comprises an initiate monitoring instruction.

10. The method of claim 1, wherein executing the operation further comprises the hypervisor executing a first operation to remove the virtual processor from the memory monitoring state and executing a second operation to set the virtual processor to a sleep state.

11. The method of claim 1, further comprising:
checking, by the hypervisor, whether the virtual processor is in a privileged guest execution mode; and
executing, by the hypervisor, the operation in response to the virtual processor being in the privileged guest execution mode.

12. A system comprising:
a memory;
a processing device executing a hypervisor and operatively coupled to the memory, wherein the processing device to:
determine a data storage location for a particular instruction of a guest operating system;
detect a transition event caused by the particular instruction to transition between a virtual machine executing the guest operating system and the hypervisor, wherein the virtual machine comprises a virtual processor;
compare an instruction pointer of the virtual processor and the data storage location of the particular instruction to determine a cause of the transition event, wherein a match between a value of the instruction pointer and at least one value of the data storage location indicates that an instruction executed by the virtual processor is the particular instruction which caused the transition event; and
execute an operation in response to the transition event and corresponding to the cause of the transition event, the operation comprising a modification of a memory monitoring state of the virtual processor, the memory monitoring state indicating whether the virtual processor is configured to monitor a predetermined storage.

13. The system of claim 12, wherein to determine the data storage location of the particular instruction the processing device is to receive the data storage location from the guest operating system during an initialization of the guest operating system, wherein the data storage location indicates a memory location of the particular instruction within memory managed by the guest operating system.

14. The system of claim 12, wherein the data storage location of the particular instruction comprises a plurality of data storage locations and each of the plurality of data storage locations corresponds to an instance of the particular instruction within the guest operating system.

15. A non-transitory machine-readable storage medium storing instructions that cause a processing device executing a hypervisor to:
receive a data storage location for a particular memory monitoring instruction of a guest operating system;
detect a transition event caused by the particular instruction to transition between a virtual machine executing the guest operating system and the hypervisor, wherein the virtual machine comprises a virtual processor;
compare, by the hypervisor, an instruction pointer of the virtual processor and the data storage location of the particular instruction to determine a cause of the transition event, wherein a match between a value of the instruction pointer and at least one value of the data storage location indicates that an instruction executed by the virtual processor is the particular instruction which caused the transition event; and
execute, by the hypervisor, an operation in response to the transition event and corresponding to the cause of the transition event, wherein the operation removes the virtual processor from a memory monitoring state, the operation comprising a modification of a memory monitoring state of the virtual processor, the memory monitoring state indicating whether the virtual processor is configured to monitor a predetermined storage.

16. The non-transitory machine-readable storage medium of claim 15, wherein to determine the data storage location of the particular memory monitoring instruction the processing device is to receive the data storage location from the guest operating system during an initialization of the guest operating system, wherein the data storage location indicates a memory location of the particular memory monitoring instruction within memory managed by the guest operating system.

17. The non-transitory machine-readable storage medium of claim 15, wherein the data storage location of the particular memory monitoring instruction comprises a plurality of data storage locations and each of the plurality of data storage locations corresponds to an instance of the particular memory monitoring instruction within the guest operating system.

18. The non-transitory machine-readable storage medium of claim 15, wherein the transition event represents a force transition of a physical processor from executing a virtual machine to executing the hypervisor.

19. The non-transitory machine-readable storage medium of claim 15, wherein the instruction pointer of the virtual processor indicates a data storage location of a previously executed instruction and wherein the comparing comprises determining that the data storage location of the previously executed instruction matches the data storage location of the particular memory monitoring instruction.

\* \* \* \* \*